(12) United States Patent
May

(10) Patent No.: US 6,743,460 B2
(45) Date of Patent: Jun. 1, 2004

(54) TOMATO RAISIN

(75) Inventor: Edward May, Las Vegas, NV (US)

(73) Assignee: Tomasin L.L.C., Gilroy, CA (US)

( * ) Notice: Subject to any disclaimer, the term of this patent is extended or adjusted under 35 U.S.C. 154(b) by 276 days.

(21) Appl. No.: 10/092,153

(22) Filed: Mar. 5, 2002

(65) Prior Publication Data

US 2003/0170372 A1 Sep. 11, 2003

(51) Int. Cl.⁷ .................................................. A23L 3/40
(52) U.S. Cl. ....................................... 426/640; 426/465
(58) Field of Search ................................ 426/640, 443, 426/456, 464, 465, 473, 489

(56) References Cited

U.S. PATENT DOCUMENTS

| | | | | |
|---|---|---|---|---|
| 4,297,381 A | * | 10/1981 | Tenuta ......................... | 426/615 |
| 4,569,850 A | * | 2/1986 | Harris et al. ................. | 426/482 |
| 5,510,131 A | * | 4/1996 | Poulose et al. .............. | 426/102 |
| 5,786,014 A | | 7/1998 | Creed et al. ................. | 426/287 |
| 6,007,855 A | | 12/1999 | Creed et al. ................. | 426/231 |
| 6,155,163 A | | 12/2000 | Creed et al. .................. | 99/516 |
| 6,311,611 B1 | | 11/2001 | Frenkel et al. ................ | 99/469 |

FOREIGN PATENT DOCUMENTS

GB      1 602 308    * 11/1981

OTHER PUBLICATIONS

Jaffrey, Madhur. "Oven–Dried Tomatoes", Madhur Jaffrey's World Vegetarian. Clarkson Potter Publishers, Nov. 1999; ISBN 0517596326.*

Yoon et al., "Development and quality of dried cherry–tomatoes" (English abstract only), Journal of the Korean Society of Food Science & Nutrition (1999), 28(6):1283–1287.*

Sugarman, C. "Attack of the Grape Tomatoes", Washington Post, Sep. 12, 2001, p. F01.* http://www.santasweets.com/focus–flavor.php; copyright 2004, "Dried Grape Tomatoes".*

Dunne, Niall. "Grape tomatoes: Giving the Cherries a Run for Their Money" Plants & Gardens News 16(1), Spring 2001. From http://www.bbg.org/gar2/topics/kitchen/2001sp grapetomato.html (Feb. 25, 2002), two pages.

* cited by examiner

Primary Examiner—Keith Hendricks
(74) Attorney, Agent, or Firm—Morrison & Foerster L.L.P.

(57) ABSTRACT

Tomato raisins (dried grape tomatoes) and methods of producing raisin tomatoes are described. The method involves (a) removing the skin from a grape tomato to produce a skinless grape tomato; and (b) drying the skinless grape tomato to produce a tomato raisin. The dried, skinless grape tomato has from 8% to about 16% water content.

12 Claims, No Drawings

TOMATO RAISIN

FIELD OF THE INVENTION

This invention is in the field of food products. In particular, this invention relates to tomato raisins and method of producing tomato raisins.

BACKGROUND OF THE INVENTION

Dried tomatoes, generally referred to as "sun-dried" tomatoes, are a popular food item. Similarly, dried grapes, generally referred to as "raisins" are also popular food items.

Sun-dried tomatoes are available in many formats: tomato halves, julienne cut, double-diced and triple diced tomatoes. While these forms of sun-dried tomatoes find use as appetizers, ingredients in sauces, etc., they are not moist and plump like raisins. As such, they do not offer the convenience and taste offered by a true tomato raisin. There is thus a tremendous need to develop a tomato raisin or a moist, plump dried whole tomato.

SUMMARY OF THE INVENTION

In order to meet this need, the present invention is directed to a dried, skinless grape tomato (tomato raisin) having from 8% to about 16% water content.

The present invention is futher directed to a method of producing a tomato raisin by (a) removing the skin from a grape tomato to produce a skinless grape tomato and (b) drying the skinless grape tomato to produce a tomato raisin.

In one format, the grape tomato is frozen prior to removing the skin from the grape tomato. When the grape tomato is frozen prior to skin removal, the frozen grape tomato may be thawed by exposing the frozen grape tomato to steam or warm water for a time sufficient to thaw the frozen tomato. In other formats, skin removal and thawing of the frozen tomato are carried out simultaneously.

The skin or peel of the grape tomato may be removed by treating the grape tomato with hot water, lye or steam for a time sufficient to remove the skin or peel. Such peeling or peel removal can be carried out with a mechanical peeler.

Once the peel is removed, the skinless grape tomato is dried to around 8% to about 16% water content.

The present invention is further directed to a tomato raisin produced by the process of the invention. The invention is also directed to food products including the tomato raisins of the invention.

DETAILED DESCRIPTION OF THE INVENTION

The present invention is directed to a tomato raisin and methods of producing tomato raisins.

Tomato raisins as herein defined are skinless, grape tomatoes that have been dried down to around 8 to 16% water content. Grape Tomatoes The tomato raisins of the invention are produced from grape tomatoes. Grape tomatoes are tomatoes that are smaller than traditional cherry tomatoes averaging ½ to ¾ inches in length. Grape tomatoes are shaped like grapes, are very sweet in flavor and exhibit a firm texture. Grape tomatoes are available commercially, for example, in grocery stores. A popular grape tomato variety is the Santa F1 variety available from Thomson & Morgan Ltd. Other grape tomatoes useful in the invention include the Grape Tomato available from the Tomato Growers Supply Company and the Jolly Elf available from Bell Sole Seed of Michigan and Seigers Seed Company of Michigan.

Preparing Grape Tomatoes for Drying

In order to produce the tomato raisins of the invention, the grape tomato must be kept whole during the dehydration (raisin production) process. The tomato raisins may be sliced after the raisin has been produced, if desired. This contrasts to general prior art procedures for producing sun-dried tomatoes.

Sun-dried tomatoes are sliced before dehydrating and are much larger in size than the grape tomatoes of the invention. In addition, sun-dried tomatoes are produced with the skin intact. The most common tomato used for sun-dried tomato products is a roma tomato with the size and weight 5 to 6 times that of a grape tomato. In order to prepare a sun-dried roma tomato, the roma tomato with skin intact is cut into multiple pieces. This cutting and slicing faciliates the dehydration process by increasing the surface area of the tomato available for drying. In contrast to the tomato raisins of the invention, a sliced tomato does not have the appearance of a plump, juicy raisin but simply resembles a dried piece of tomato.

In contrast to the sun-dried tomatoes of the prior art, the skin of the grape tomatoes of the present invention must be removed prior to drying. If the grape tomatoes of the invention are dried without first removing the skin, the inner core of the tomato explodes during the during the drying process creating a popcorn effect with the inside of the tomato raisin pushing its way through the skin from within. In addition to the popcorn effect, if the skin of the grape tomato is left on the fruit prior to drying, the skin becomes dry and flaky during the drying process and the grape tomato loses its color and shape.

Skin Removal

It is desirable to minimize loss of tomato tissue, that is tissue from the body of a grape tomato, when separating the skins from the grape tomatoes. Tomato skins are generally removed by exposing the tomato to increased temperatures (liquid or steam) or treatment with caustic substances. In this invention, the preferred format for skin removal is treating the grape tomatoes with warm or hot water ranging from 30° C. to slightly less than 100° C. Boiling water (100° C.) will damage the tomatoes. The tomatoes may be placed directly in the warm or hot water. Alternatively, a steam peeler may be used. A steam peeler is a common device for heat treating tomatoes to separate their skins. Steam peelers are pressurized chambers of hot, saturated steam through which tomatoes are conveyed for a relatively short period of time to heat their skins, which causes the skin material to break away from the tomato body. After the steam peeler, the tomatoes move through scrubbers, which physically remove the skins. In caustic peeler systems, fruits such as tomatoes are subjected to a caustic substance, such as lye, which softens the skin. The tomatoes are then subjected to a scrubber to remove the skins and pectinous material from the tomatoes. Such peelers are available commercially. Exemplary, but in no way limiting of the peelers that find use in the invention include those described in U.S. Pat. Nos. 6,311,611; 6,155, 163; 6,082,252; 6,056,987; 6,007,855 and 5,786,014 which are hereby incorporated by reference.

While not required, it has been discovered that it is advantageous to freeze the grape tomatoes prior to peeling. The tomatoes may be frozen by placing the tomatoes at 0° C. or less for a time sufficient for freezing. The freezing may be carried out by peforming a quick freeze using a tunnel conveyor-type freezer. Exposure to liquid $N_2$ or dry ice will also work. Such frozen tomatoes may be kept frozen indefinitely prior to skin removal.

Frozen tomatoes may be thawed prior to skin removal. Alternatively, the frozen tomatoes may proceed directly to simultaneous thawing and skin removal. For example, if the frozen tomatoes are exposed to warm to hot water, the tomato skin is removed. This is the preferred format. Alternatively, the outer layer of the skin of the grape tomato can be also be removed by treatment with lye or with steam.

After treatment with warm to hot water, lye or steam, the tomatoes are then run trough a peeling machine as described above to remove the skin.

The tomatoes may or may not be scored (placing a small slice on the skin of the tomato) prior to peeling. Scoring can faciliate skin removal. Such scoring can be performed before or after freezing.

Tomato Drying

After the skin is removed, the skinless grape tomatoes are dried. Such drying can be carried out with commercially available fruit dryers. Exemplary, but in no way limiting of the dryers that find use in the invention include those described in U.S. Pat. Nos. 6,023,852; 5,832,627 and 5,584,127 all of which are hereby incorporated by reference.

The skinless grape tomatoes of the invention are generally dried down to a moisture content from about 8% to 16% moisture to form the tomato raisins. The dried tomato raisins may be treated with $SO_2$ by procedures well know in the art to aid in preservation. A moisture content of around 8%–10% is preferred for storing the tomato raisins as the low water content minimizes microbial growth. A moisture content of around 16% is preferred for market-ready tomato raisins. Tomato raisins with a water content around 16% are generally more flavorful than those with a lower water content.

Tomato Raisins

Drying the skinless grape tomato exposes the flesh of the tomato to a uniform dehydration/drying process whereby the active water contained throughout the fruit is released in a uniform manner, allowing the grape tomato to maintain shape, flavor, texture and color. As the flesh becomes firm during the dehydration process, less fluid is released and the outer flesh becomes slightly or partially dried. At this point, the tomato begins to shrivel inward and begins to take on the appearance of a raisin-like product or tomato raisin. Once the active water level has been reduced to a low level (8–16%), the grape tomato texture takes on a soft and chewy characteristic with a bursting tomato flavor, as does a dehydrated cranberry. The flavor is sweet and tart and yet mild and easy to chew.

When eaten, the dehydrated grape tomato melts away in the eater's mouth as the product is naturally rehydrated. At full color it is as bright as the mature color of the non-dehydrated grape tomato.

In contrast, sun-dried cut tomatoes do not possess the full color of the peeled dehydrated grape tomato raisin of the invention due to the appearance of the skin that turns brown or carmel colored after the drying process has occurred. With the removal of the skin, the raisin tomato of the invention maintains the bright red color of the fresh tomato flesh and is not distorted by the browning effect of the dried skin. The appearance of the grape tomato raisin is significantly different than the cut and dried tomato product. Tomato raisins remain whole whereas sun dried tomato products are cut or sliced. Sun dried tomato products are large, dull in color and not very sweet. Tomato raisins are smaller; maintain the grape shape, sweeter in flavor, higher in sugar, and higher in lycopene content. Because of the skinless characteristic, the tomato raisin is easier to eat, and the product rehydrates faster in the mouth with more of a berry and tomato flavor due to low acid and high sugar content. Grape tomato raisins are soft and chewy due to maintaining its whole form, having the center of the tomato with active juices for flavor, not like a sun-dried tomato product which can be as dry and hard as a piece of wood or leather.

The tomato raisins of the invention may be sliced after the raisin is produced.

The invention will be better understood by reference to the following non-limiting example.

EXAMPLE

Fresh grape tomatoes were dried under various conditions and compared. Fresh grape tomatoes (Variety RFT 9981-Navidad) had the following initial characteristics:

| | |
|---|---|
| V.O. Solids | 8.9% |
| Brix | 7.7% |
| Ph | 4.18% |
| Titratable Acids | 1.07% |

V.O. solids is a measurement of total solids/insoluble solids by baking in an oven. Brix is a measurement of sugar content. Brix values may be converted to specific gravity values by multiplying the brix reading by 0.00425 and then adding 0.9988 to the resulting number. This provides a close approximation of the equivalent figure for the specific gravity of sucrose at 20° C.

Unpeeled, peeled, peeled/calcium treated and peeled/$SO_2$ treated raisins were compared for start weight, finish weight, % recovery, shrink ratio, moisture % and active water. The results are presented in Table 1.

TABLE I

Tomato Raisin Samples

| Sample Description | 1 Un-Peel | 2 Whole Peel | 3 Whole Peel (CA** treated) | 4 Whole Peel ($SO_2$ Treated) |
|---|---|---|---|---|
| Start Weight (grams) | 1245 | 1245 | 1245 | 1245 |
| After/DehyWeight (grams) | 106 | 86 | 74 | 76 |
| Recovery % | 8.5 | 6.9 | 5.9 | 6.1 |
| Shrink Ratio | 11.7 | 14.5 | 16.8 | 16.4 |
| Moisture % | 11 | 9.5 | 8.8 | 10.2 |
| Active water | 0.538 | 0.466 | 0.449 | 0.443 |

The results show that the unpeeled tomatoes had a significantly higher (25%) recovery of start weight than unpeeled samples. Moisture was about 10% in finished products with active water about 0.45. Active water target is <0.60 for mold stability giving about 12 months of stability.

Samples treated with calcium were the easiest to handle. Samples treated with $SO_2$ had the best color.

What I claim:

1. A method of producing a tomato raisin, comprising:
   (a) removing the skin from a grape tomato to produce a skinless grape tomato; and
   (b) drying said skinless grape tomato to produce a tomato raisin.

2. The method of claim 1 wherein said grape tomato is frozen prior to removing the skin from the grape tomato to form a frozen grape tomato.

3. The method of claim 2 wherein said frozen grape tomato is thawed by exposing said grape tomato to steam or warm water at a temperature less than 100° C. for a time sufficient to thaw said frozen grape tomato.

4. The method of claim 1 wherein said skin is removed by treating said grape tomato with lye or steam for a time sufficient to remove said peel.

5. The method of claim 2 wherein said skin is removed by treating said frozen tomato with water at a temperature less than 100° C. to remove said skin from said frozen tomato.

6. The method of claim 1 wherein said skinless grape tomato is dried to around 8% to about 16% water content.

7. The method of claim 1 wherein said skin is scored or nicked prior to removal.

8. A tomato raisin produced by the process of claim 1.

9. The tomato raisin of claim 8 wherein said tomato raisin is sliced after drying.

10. A food product comprising the tomato raisin of claim 8.

11. A dried, skinless grape tomato having from 8% to about 16% water content.

12. The grape tomato of claim 11 wherein said tomato is sliced.

* * * * *